(12) United States Patent
Palmer

(10) Patent No.: US 11,297,962 B2
(45) Date of Patent: Apr. 12, 2022

(54) PLATE RUNNER DEVICE

(71) Applicant: Russell B. Palmer, Gregory, MI (US)

(72) Inventor: Russell B. Palmer, Gregory, MI (US)

( * ) Notice: Subject to any disclaimer, the term of this patent is extended or adjusted under 35 U.S.C. 154(b) by 363 days.

(21) Appl. No.: 16/225,542

(22) Filed: Dec. 19, 2018

(65) Prior Publication Data

US 2020/0196781 A1    Jun. 25, 2020

(51) Int. Cl.
*A47G 19/08* (2006.01)
*F16M 13/04* (2006.01)
*F16B 2/10* (2006.01)

(52) U.S. Cl.
CPC .............. *A47G 19/08* (2013.01); *F16B 2/10* (2013.01); *F16M 13/04* (2013.01)

(58) Field of Classification Search
CPC .................................. A47G 19/08; F16B 2/10
USPC ................................................ 294/143, 161
See application file for complete search history.

(56) References Cited

U.S. PATENT DOCUMENTS

| | | | | |
|---|---|---|---|---|
| 953,007 | A | | 3/1910 | Haller |
| 1,167,934 | A | * | 1/1916 | Roth ...................... A47G 19/08 294/143 |
| 1,379,379 | A | * | 5/1921 | Abrahmsen ............. A47L 17/10 211/41.4 |
| 2,916,180 | A | * | 12/1959 | Alger ..................... A47G 19/08 220/23.86 |
| 3,533,590 | A | * | 10/1970 | Swire .................. A47G 23/0225 248/311.2 |
| 4,448,313 | A | * | 5/1984 | Pomeroy ............ A61B 10/0038 211/41.1 |
| D379,747 | S | * | 6/1997 | Carter ............................. D7/505 |
| 5,769,264 | A | | 6/1998 | Lipkowitz |
| 7,708,248 | B2 | * | 5/2010 | Lagobi ............... A47G 23/0225 248/313 |
| 8,186,524 | B2 | | 5/2012 | Siahpush |
| 8,292,342 | B2 | * | 10/2012 | Lord ......................... A45F 5/00 294/161 |
| 9,986,858 | B1 | * | 6/2018 | Sedano .................. A47G 19/08 |
| 2009/0195005 | A1 | | 8/2009 | Lord |
| 2013/0068806 | A1 | * | 3/2013 | Bayles ................... A47G 19/08 224/191 |
| 2015/0014495 | A1 | * | 1/2015 | Bausman ................ A47J 47/16 248/176.2 |
| 2017/0172329 | A1 | | 6/2017 | Wickstrom |

FOREIGN PATENT DOCUMENTS

| | | |
|---|---|---|
| FR | 2951057 | 4/2011 |
| GB | 911 438 | 11/1962 |
| WO | WO 2011/0128323 | 10/2011 |

\* cited by examiner

*Primary Examiner* — Paul T Chin
(74) *Attorney, Agent, or Firm* — Mitchell Law PLLC; Matthew W. Mitchell

(57) ABSTRACT

A plate runner device includes an elongated device body configured to be attached to an upper arm of a user and at least one plate clamp attached to the device body. The plate clamp is configured to secure a dinner plate to the plate runner device. The device can include an upper retention portion at an upper end of the device body and a forearm rest at a lower end of the device body.

14 Claims, 11 Drawing Sheets

PLATE RUNNER DEVICE

TECHNICAL FIELD

This disclosure is related to a device useful to wait staff in a restaurant, in particular, to a device useful to enable a person to carry extra plates from a kitchen to a customer table.

BACKGROUND

The statements in this section merely provide background information related to the present disclosure. Accordingly, such statements are not intended to constitute an admission of prior art.

Wait staff in restaurants carry large numbers of prepared plates of food from a kitchen to customer tables. Plates can be carried individually, with one plate in each hand. Plates can be loaded upon an exemplary circular tray. Large trays loaded with heavy plates of food are cumbersome, wide, awkward, and frequently dropped. Dropped trays not only make customers upset that have to wait for their food to be prepared a second time, dropped plates of food are loud, disturbing, and can strike customers as they are dropped.

Plate carrying racks are known which include a handle for a person to hold, with plates arranged concentrically around the handle. The person grabs the handle and can carry the rack to the table. However, such a rack including multiple plates is wide and requires the user to hold the rack well out to the side of the user to avoid the plates hitting the user. Such a heavy weight being held out to the side of the user, the user's arms being extended outward horizontally, is a poor ergonomic design and can fatigue or injure the user. Further, the user, carrying two of these racks, one in each hand, is a wide obstacle within a busy restaurant, and would have a difficult time avoiding customers and moving between closely packed tables.

SUMMARY

A plate runner device includes an elongated device body configured to be attached to an upper arm of a user and at least one plate clamp attached to the device body. The plate clamp is configured to secure a dinner plate to the plate runner device. The device can include an upper retention portion at an upper end of the device body and a forearm rest at a lower end of the device body.

BRIEF DESCRIPTION OF THE DRAWINGS

One or more embodiments will now be described, by way of example, with reference to the accompanying drawings, in which.

DETAILED DESCRIPTION

A plate runner device or plate carrying rack is disclosed which enables a wait staff employee to bring out multiple plates from a restaurant kitchen area to a service table at one time. The device is useful in that the plates are kept close to the body of the user and maintain a overall small footprint for the employee, enabling the employee to navigate a crowded and busy restaurant environment safely. The device includes at least one plate clamp configured to affix a dinner plate to the device. The employee carrying or wearing the device can then bring the dinner plate to a service table by simply walking to the table.

The plate runner device, in one embodiment, can be secured to an arm of the wait staff employee. In one embodiment, the device can be secured at one end by tucking a retention plate into an armpit of the wearer and by resting a forearm crescent rest upon a forearm of the wearer. With such a device, the device is retained by the employee keeping the upper arm pinned against the body and by bending the forearm into a ninety degree angle with the upper arm.

In another embodiment, the device can be strapped or secured by an elastic sleeve portion to the arm of the employee.

Figure 1:
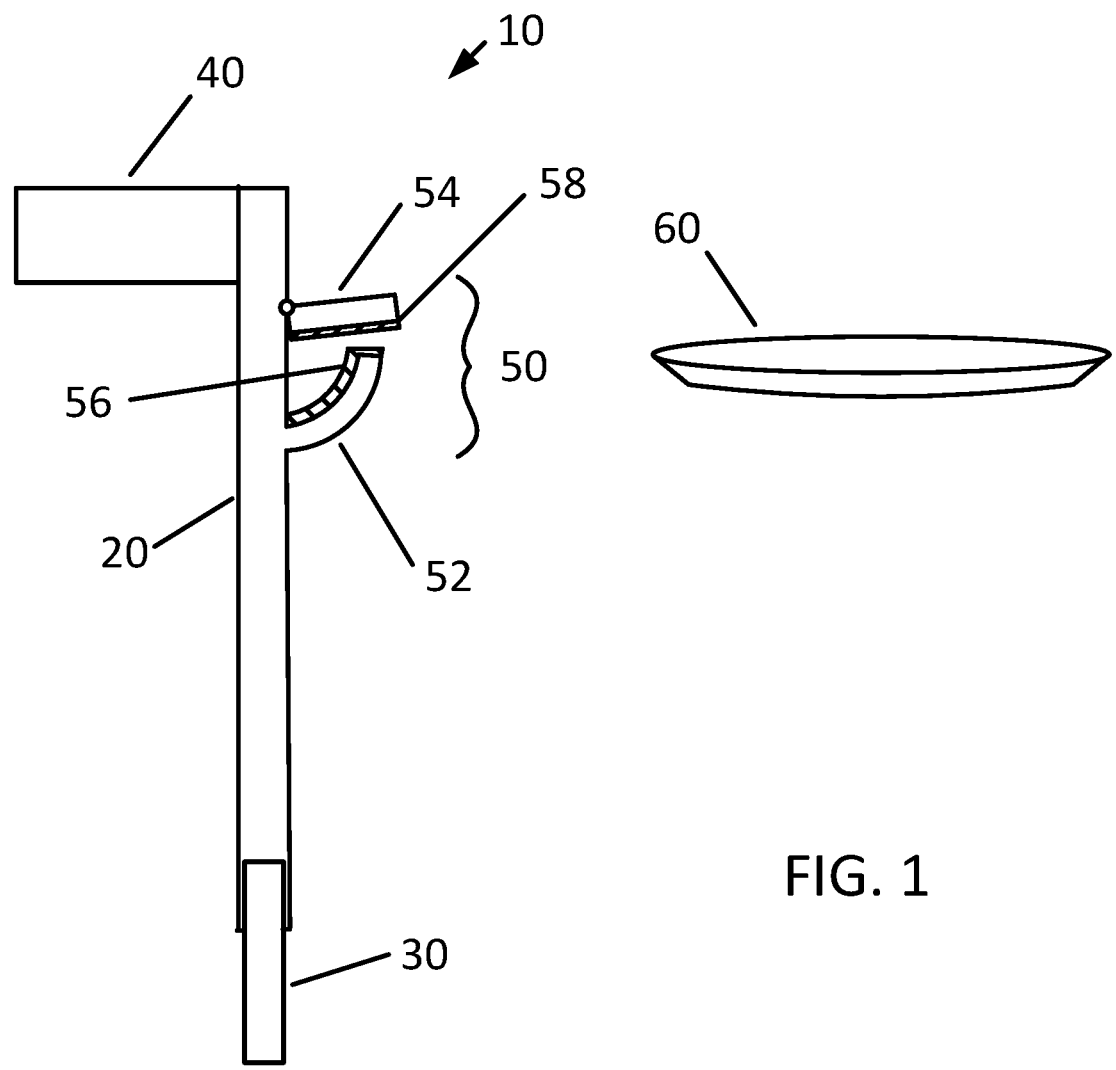
FIG. 1 illustrates an exemplary plate runner device useful to help a wait staff employee to bring multiple plates to a serving table at one time from a side view, in accordance with the current disclosure.

Referring now to the drawings, wherein the showings are for the purpose of illustrating certain exemplary embodiments only and not for the purpose of limiting the same, FIG. 1 illustrates an exemplary plate runner device useful to help a wait staff employee to bring multiple plates to a serving table at one time from a side view. FIG. 1 illustrates plate runner device 10 including an elongated device body 20 with an upper retention portion embodied as an armpit retention plate 40 at an upper end and a forearm rest embodied as forearm crescent rest 30 at a lower end. Device body 20 can be a round cylinder, a square tube, a flat plate, or any other similar structure. Forearm crescent rest 30 can be replaced by a forearm rest of any shape, including a flat pad. Plate clamp 50 is illustrated including an exemplary stationary arm 52 and exemplary pivoting arm 54. Arms 52 and 54 are configured to grip onto plate 60. Either arm 52 or 54 can be coated with an optional rubberized compressible grip material 56 and 58, respectively, configured to aid plate clamp 50 in securely gripping plate 60.

Figure 2:
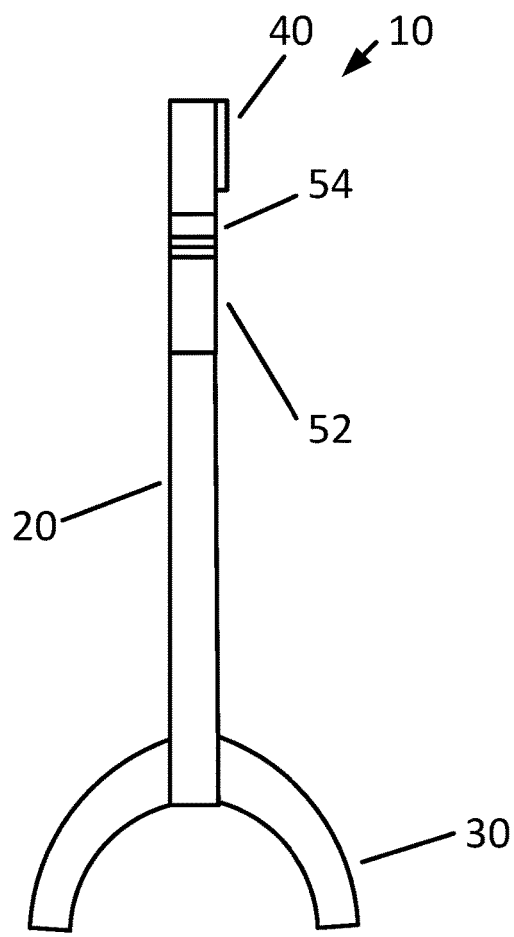
FIG. 2 illustrates the plate runner device of FIG. 1 from a front view, in accordance with the present disclosure.

FIG. 2 illustrates the plate runner device of FIG. 1 from a front view. Plate runner device 10 is illustrated including device body 20, retention plate 40, and forearm crescent rest 30. Stationary arm 52 and exemplary pivoting arm 54 of the plate clamp are illustrated.

Figure 3:
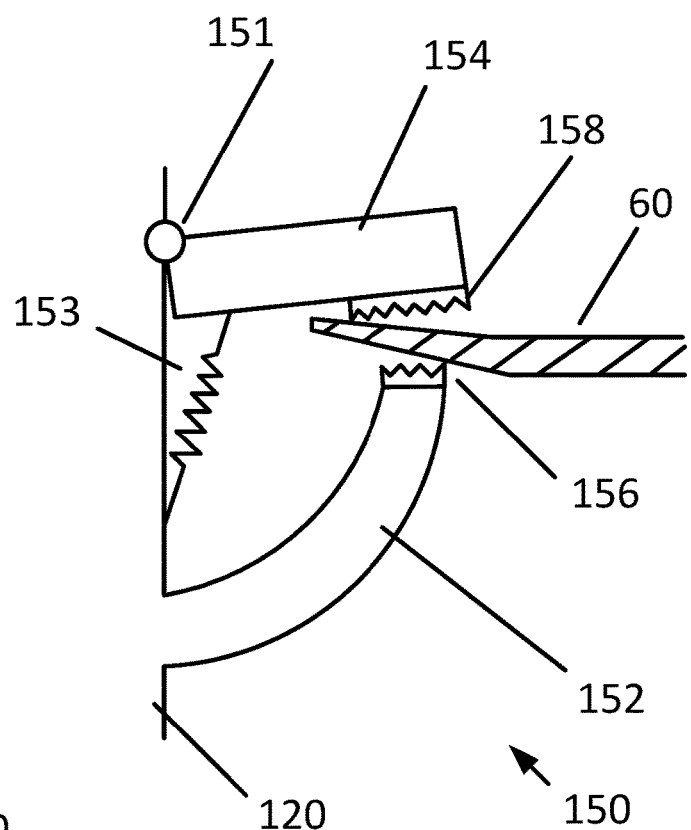
FIG. 3 illustrates an exemplary embodiment of the plate clamp of the plate runner device of FIG. 1, with a rotating upper arm and where a spring is used to provide clamping force upon a plate being carried, in accordance with the present disclosure.

Plate clamps can grip to and secure plates to the plate runner device in a number of different ways. Non-limiting examples include spring loaded clamps, snap together clamps, magnetic clamps, magnetic plate to device connections, and notch and groove connections between plate and the device. A number of exemplary ways to securely attach a plate to a plate runner device are envisioned, and the disclosure is not intended to be limited to the particular examples provided herein. FIG. 3 illustrates an exemplary version of the plate clamp of the plate runner device of FIG. 1, where a spring is used to provide clamping force upon a plate being carried. Device body 120 is illustrated. Plate clamp device 150 is illustrated attached to device body 120. Plate clamp device 150 includes stationary arm 152 and pivoting arm 154. Stationary arm 152 does not move and an end of arm 152 can be coated with a rubberized gripping material 156. Pivoting arm 154 is attached to device body 120 at pivot point 151 and includes rubberized gripping material 158. Plate 60 is illustrated gripped between arms 152 and 154. Exemplary linear spring 153 is illustrated providing a downward force upon arm 154, such that arm 154 provides a gripping force upon plate 60. Other types of spring such as a rotary or torsion spring can be oriented, for example, about pivot point 151 to provide the same gripping force.

Figure 4:
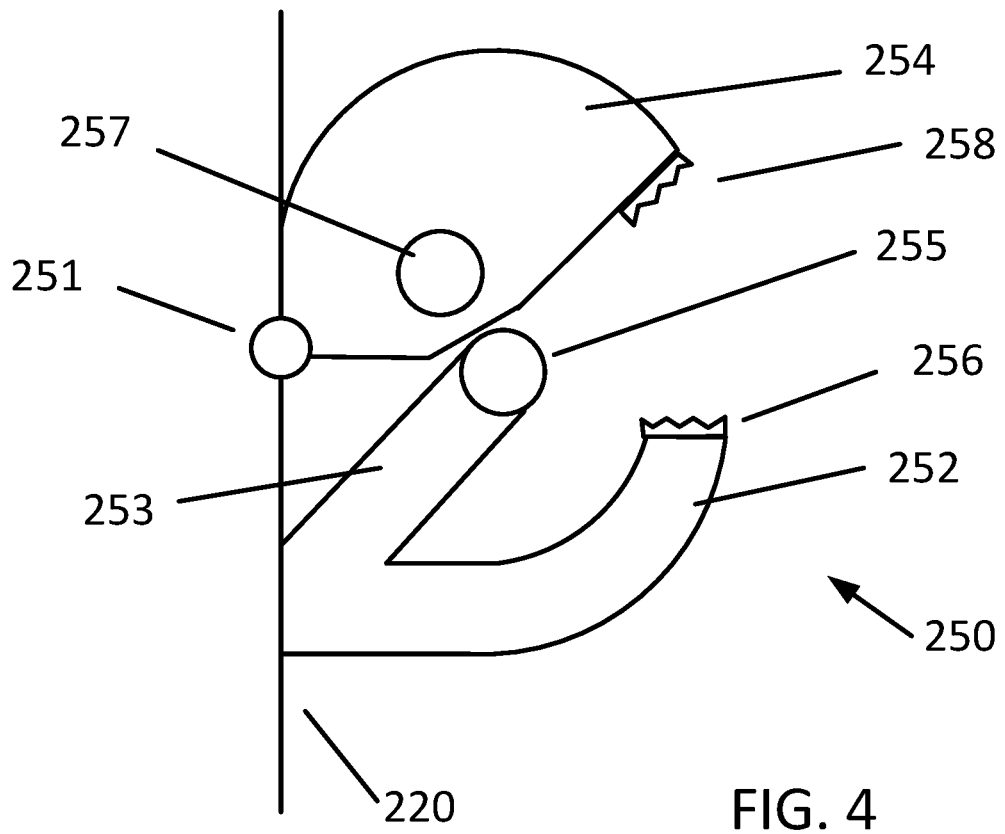
FIG. 4 illustrates an exemplary alternative plate clamp, with a snapping button enabling one to snap the clamp in place over a plate, in accordance with the present disclosure.

FIG. 4 illustrates an exemplary alternative plate clamp, with a locking snap tab including a snapping button enabling one to snap the clamp in place over a plate. Device body 220 is illustrated. Plate clamp 250 is illustrated attached to device body 220 and includes stationary arm 252 and pivoting arm 254. Stationary arm 252 includes a gripping material 256 upon an end of the arm. Stationary arm 252 further includes a flexing arm 253 including a snapping button 255. Pivoting arm 254 is attached to device body 220 at pivot point 251, includes gripping material 258, and further includes a hole 257 configured to mate with button 255, such that when pivoting arm 254 is pivoted downward, button 2556 snaps into hole 257 and provides a gripping force upon a plate situated between arms 252 and 254.

Figure 5:
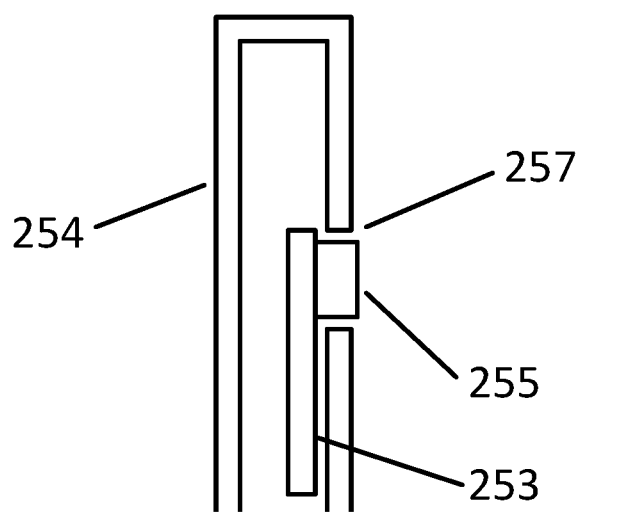
FIG. 5 illustrates the plate clamp of FIG. 4 in section, showing the snapping button engaged with a top half of the clamp, in accordance with the present disclosure.

FIG. 5 illustrates the plate clamp of FIG. 4 in section, showing the snapping button engaged with a top half of the clamp. Pivoting arm 254 is illustrated in cross section, with hole 257 being configured to receive button 255 attached to flexing arm 253. By simply pressing inwardly upon button 255, the snapping retention of pivoting arm 254 to the stationary arm is released, and a plate held by the two arms can be released.

Figure 6:
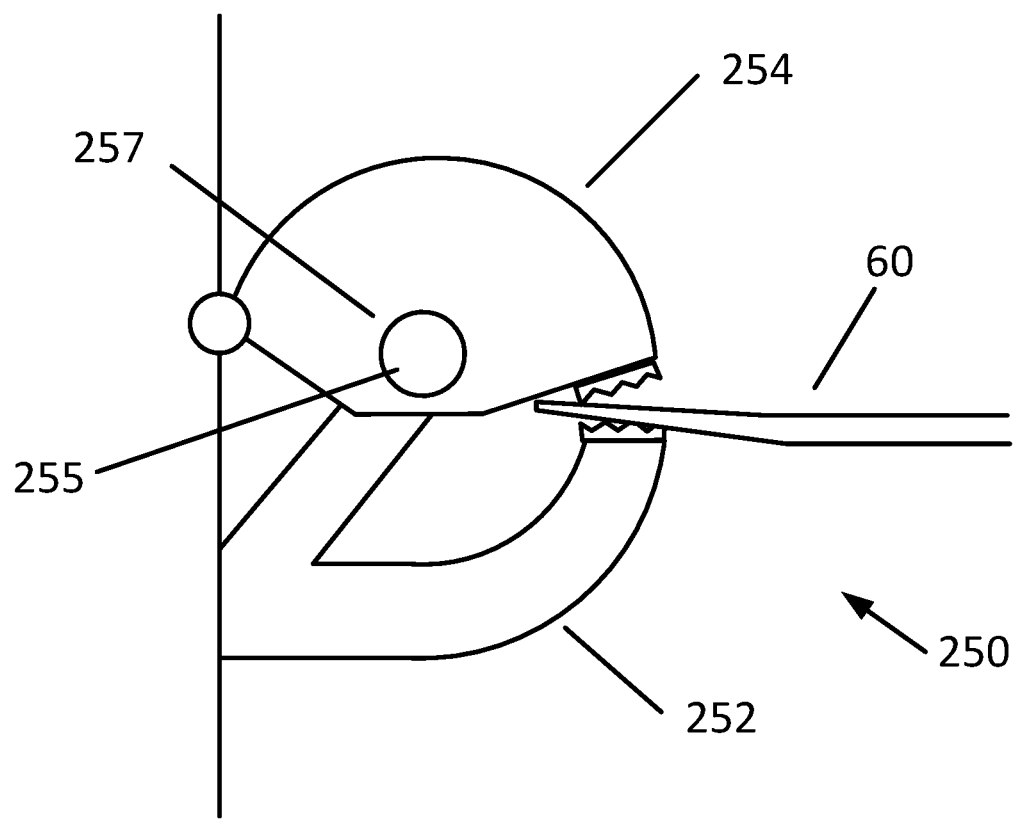
FIG. 6 illustrates the plate clamp of FIG. 6 in a snapped clamped state holding a plate in place, in accordance with the present disclosure.

FIG. 6 illustrates the plate clamp of FIG. 4 in a snapped clamped state holding a plate in place. Button 255 is illustrated snappingly engaged to hole 257, such that pivoting arm 254 is held firmly in place against stationary arm 252. In this way, plate clamp 250 holds plate 60 firmly in place until button 255 is depressed to release the plate.

Figure 7:
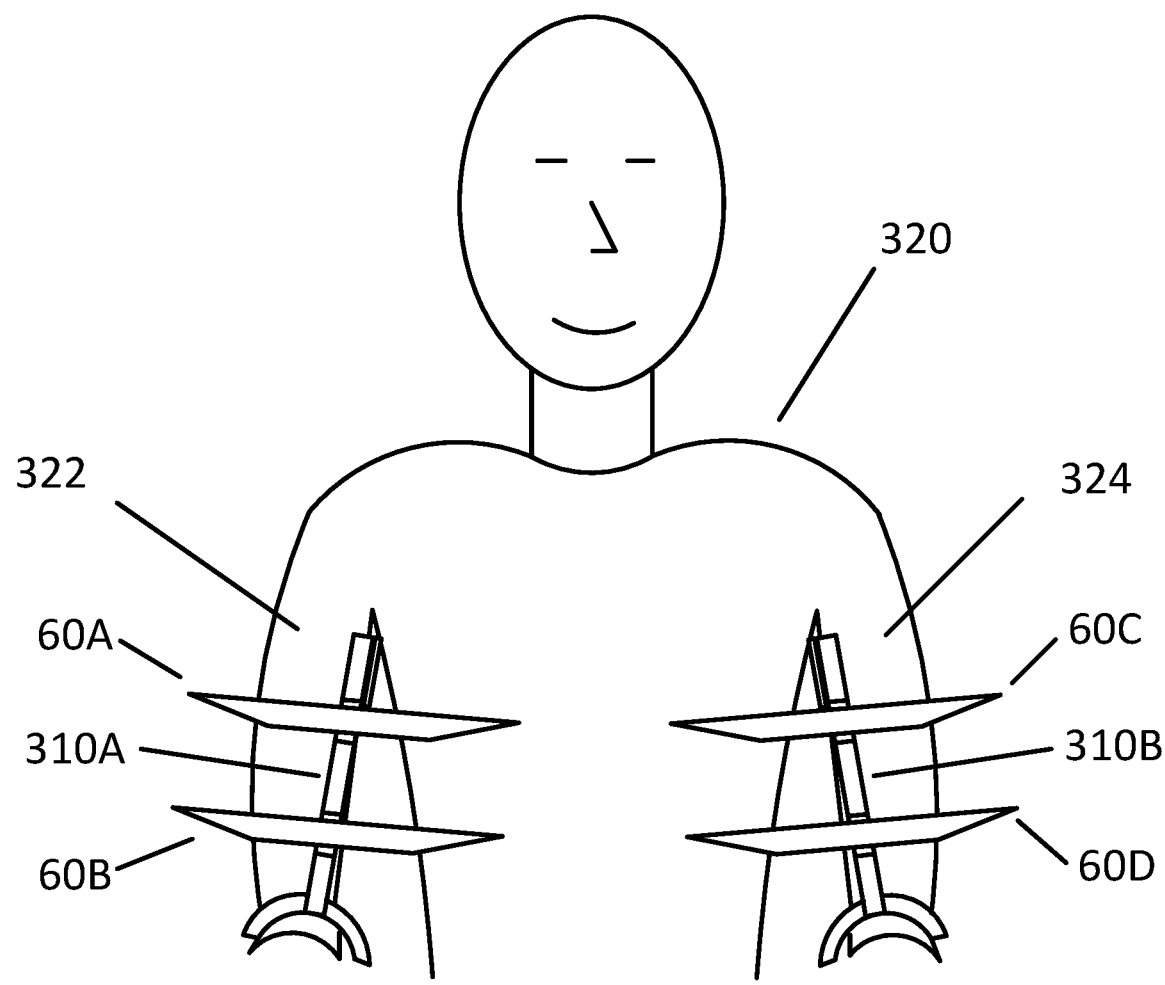
FIG. 7 illustrates a server using two versions, a left hand device and a right hand device, of an alternative version of the device of FIG. 1, with two plate clamps holding plates to each of the illustrated devices, in accordance with the present disclosure.

FIG. 7 illustrates a server using two versions, a left hand device and a right hand device, of an alternative version of the device of FIG. 1, with two plate clamps holding plates to each of the illustrated devices. Wait staff employee 320 is illustrated, with a first plate runner device 310A installed to a right arm 322 and with a second plate runner device 310B installed to a left arm 324. Device 310A is illustrated holding first and second plates 60A and 60B in place, while device 310B is illustrated holding third and fourth plates 60C and 60D in place. It will be appreciated that the employee could further be holding a plate in each hand. In this way, the employee can carry a significant plurality of plates within a busy restaurant environment without carrying a wide tray or a clumsy handled rack which must be held out away from the body of the employee.

Figure 8:
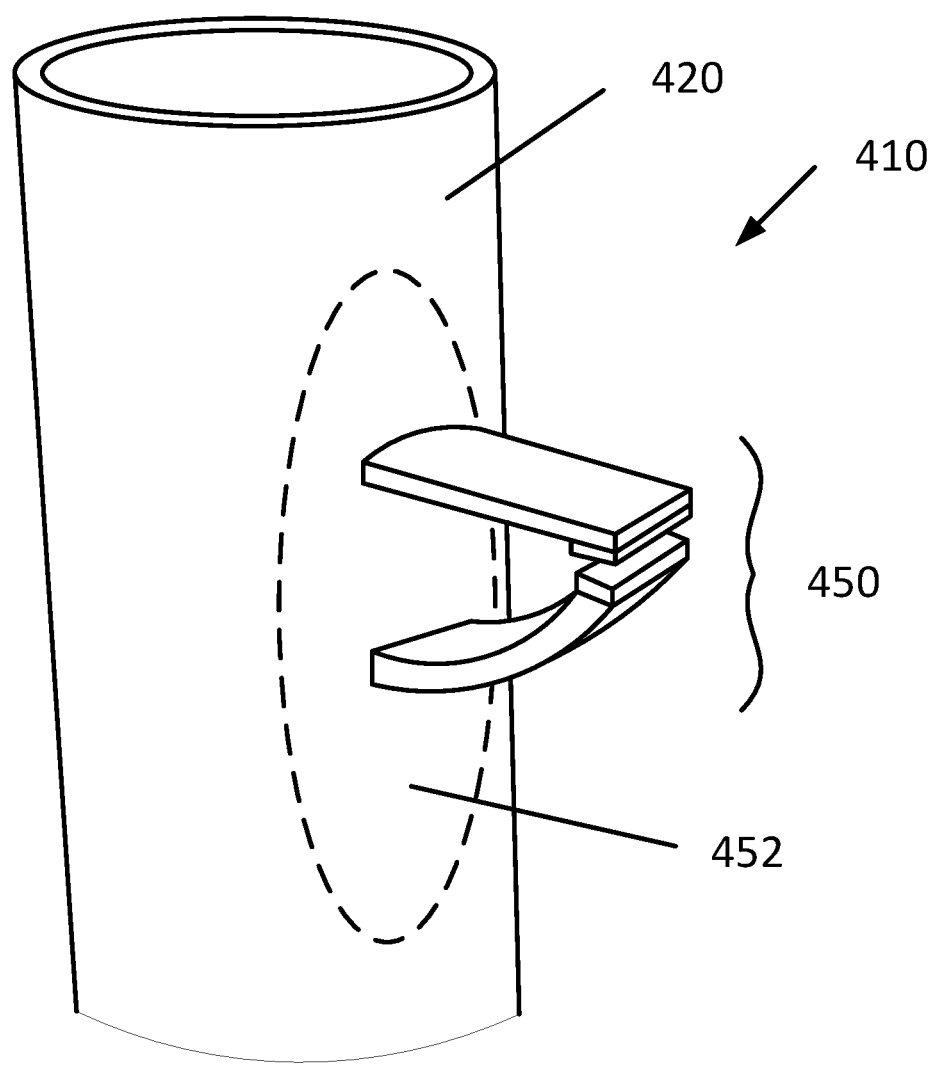
FIG. 8 illustrates an alternative exemplary embodiment of the device of FIG. 1, with a stretchy elastic-type material forming a cylindrical sleeve configured to fit over the upper arm of a user and with a plastic plate being held internal to the sleeve, with plate clamp members being connected to the plastic plate and extending outside the sleeve to hold a plate, in accordance with the present disclosure.

In the alternative to the embodiment of FIG. 1, straps or an elastic sleeve can be used to secure the device body to the arm of the wearer. FIG. 8 illustrates an alternative exemplary embodiment of the device of FIG. 1, with a stretchy elastic-type material forming a cylindrical sleeve configured to fit over the upper arm of a user and with a plastic plate being held internal to the sleeve, with plate clamp members being connected to the plastic plate and extending outside the sleeve to hold a plate. Plate runner device 410 is illustrated including an exemplary spandex or elastane sleeve 420 in the form of a cylinder configured to fit over the upper arm of a wearer. Plastic plate 452 is illustrated fit within and secured to sleeve 420. Plastic plate 452 provides rigidity and acts as a device body for the plate runner device. Two plastic arms make up plate clamp 450. Elasticity in the plastic arms provide gripping force between the arms of clamp 450.

Figure 9:
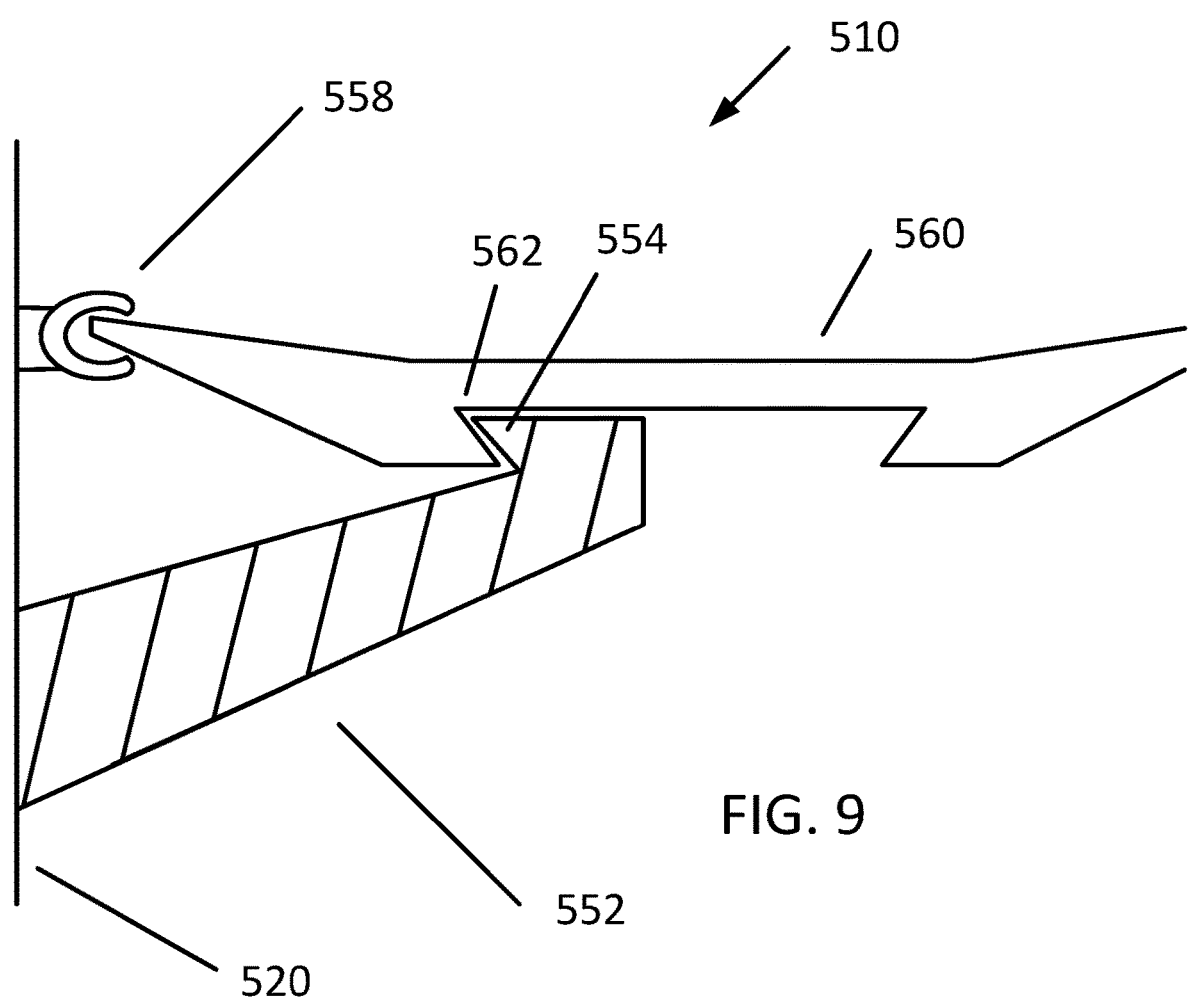
FIG. 9 illustrates an alternative exemplary embodiment of the device of FIG. 1, with a plate including a notch formed upon a lower surface of the plate and with the device including a mating lower arm configured to grip the notch, and with a rubberized upper gripping feature holding an edge of the plate, in accordance with the present disclosure.

FIG. 9 illustrates an alternative exemplary embodiment of the device of FIG. 1, with a plate including a notch formed upon a lower surface of the plate and with the device including a mating lower arm configured to grip the notch, and with a rubberized upper gripping feature holding an edge of the plate, in accordance with the present disclosure. Plate 560 is illustrated including a notch 562 formed in a bottom surface of plate 560. Plate 560 can include a notch formed in an entire circular shape under plate 560, such that the plate can be rotated in any direction and notch 562 can be accessed from any of those rotations. In another embodiment, notch 562 can be situated in a particular discreet location or locations on a bottom of plate 560. Notch 562 mates with groove 554 located on a stationary arm 552 attached to a device body 520 of a plate runner device 510 in accordance with the present disclosure. Additionally, a rubberized upper gripping feature 558, such as an elastic C-shaped clamp can be provided to stabilize plate 560 and keep plate 560 engaged within groove 554.

Figure 10:
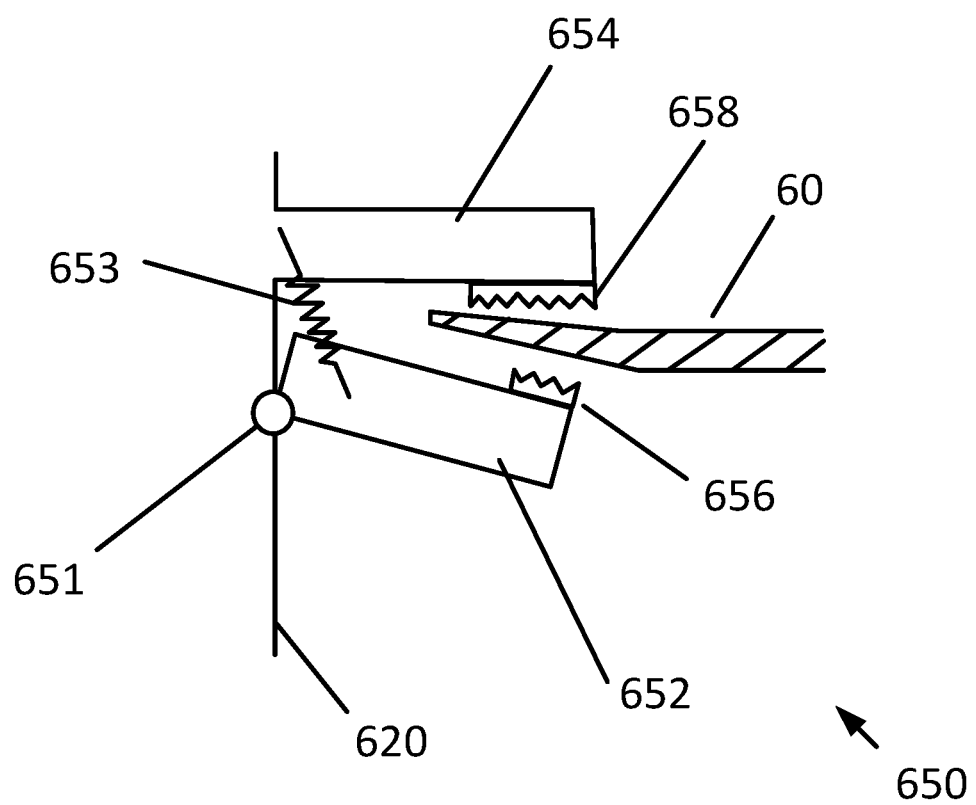
FIG. 10 illustrates an exemplary alternative embodiment of the plate clamp of the plate runner device of FIG. 3, with a rotating lower arm, in accordance with the present disclosure.

FIG. 10 illustrates an exemplary alternative embodiment of the plate clamp of the plate runner device of FIG. 3, with a rotating lower arm. Device body 620 is illustrated. Plate clamp device 650 is illustrated attached to device body 620. Plate clamp device 650 includes stationary arm 654 and pivoting arm 652. Stationary arm 654 does not move and an end of arm 654 can be coated with a rubberized gripping material 658. Pivoting arm 652 is attached to device body 620 at pivot point 651 and includes rubberized gripping material 656. Plate 60 is illustrated gripped between arms 652 and 654. Exemplary linear spring 653 is illustrated providing an upward force upon arm 652, such that arm 652 provides a gripping force upon plate 60. Other types of spring such as a rotary or torsion spring can be oriented, for example, about pivot point 651 to provide the same gripping force.

Figure 11:
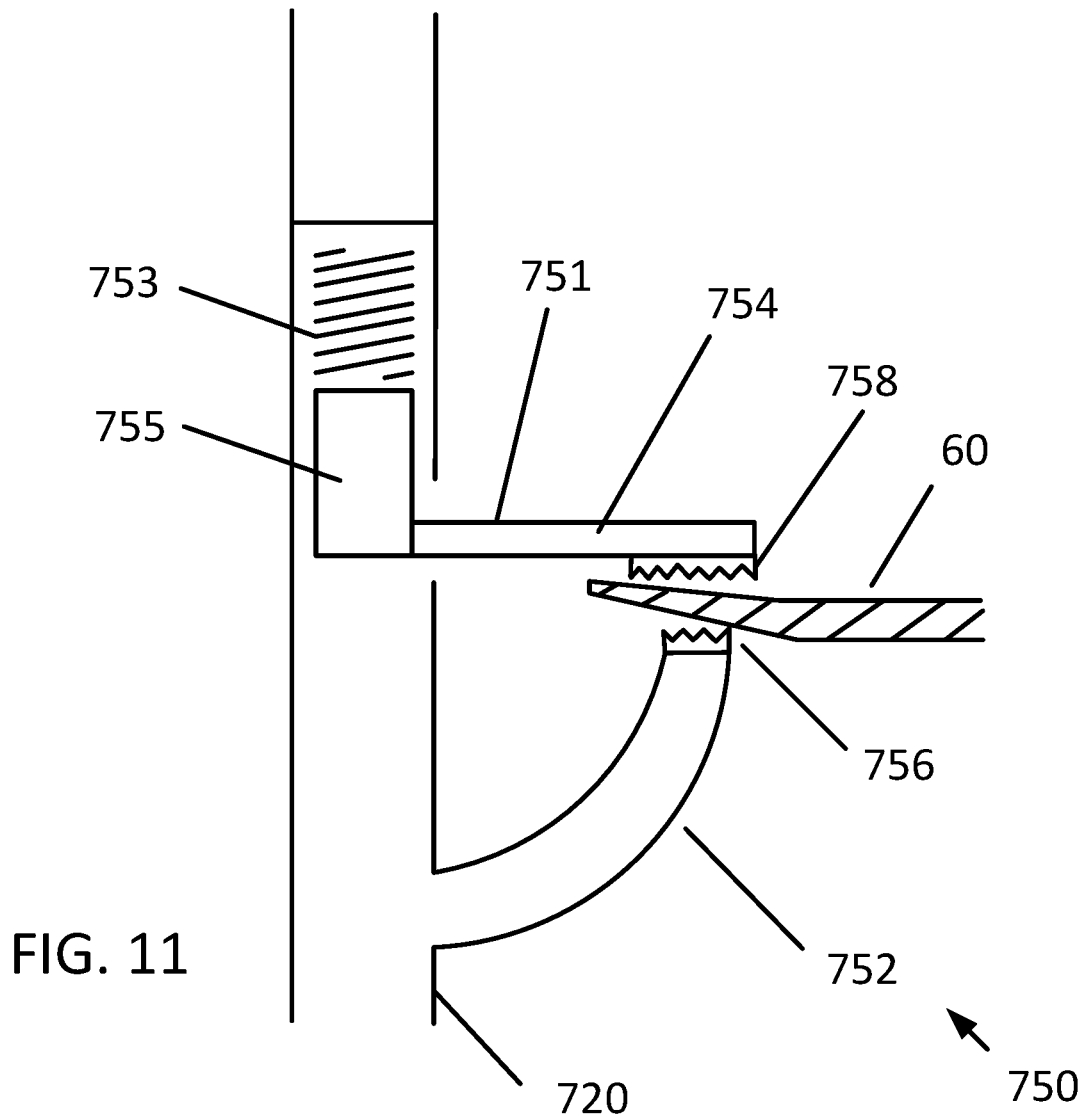
FIG. 11 illustrates an exemplary alternative embodiment of the plate clamp of the plate runner device of FIG. 3, with a linearly translating upper arm, in accordance with the present disclosure.

FIG. 11 illustrates an exemplary alternative embodiment of the plate clamp of the plate runner device of FIG. 3 in sectional view, with a linearly translating upper arm. Device body 720 is illustrated. Plate clamp device 750 is illustrated attached to device body 720. Plate clamp device 750 includes stationary arm 752 and linearly translating arm 751. Stationary arm 752 does not move and an end of arm 752 can be coated with a rubberized gripping material 756. Linearly translating arm 751 includes external arm portion 754 and internal plunger portion 755 within an internal cavity of device body 720. A spring 753 is situated within device body 720 and acts upon plunger portion 755, providing a downward force upon plunger portion 755 and linearly translating arm 751. External arm portion 754 can include rubberized gripping material 758. Plate 60 is illustrated gripped between arms 751 and 752. Exemplary linear spring 753 is illustrated providing a downward force upon arm 751, such that arm 751 provides a gripping force upon plate 60.

Figure 12:
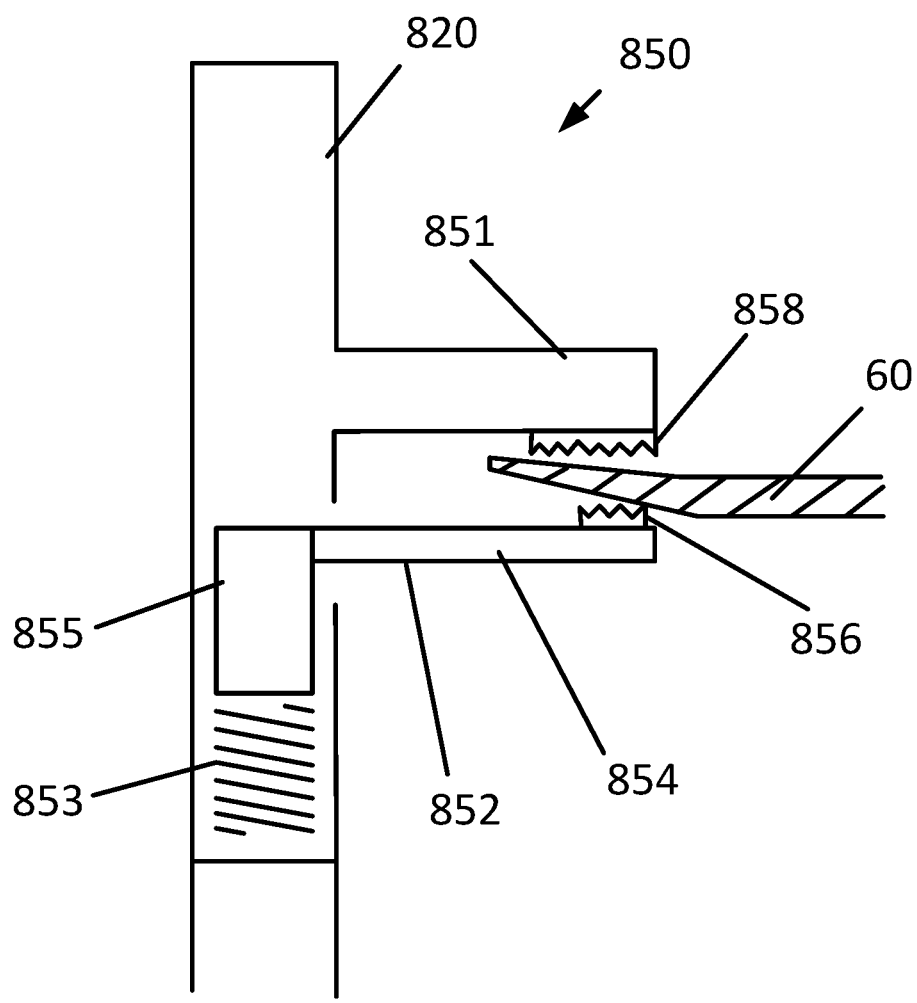
FIG. 12 illustrates an exemplary alternative embodiment of the plate clamp of the plate runner device of FIG. 3, with a linearly translating lower arm, in accordance with the present disclosure.

FIG. 12 illustrates an exemplary alternative embodiment of the plate clamp of the plate runner device of FIG. 3 in sectional view, with a linearly translating lower arm. Device body 820 is illustrated. Plate clamp device 850 is illustrated attached to device body 820. Plate clamp device 850 includes stationary arm 851 and linearly translating arm 852. Stationary arm 851 does not move and an end of arm 851 can be coated with a rubberized gripping material 858. Linearly translating arm 852 includes external arm portion 854 and internal plunger portion 855 within an internal cavity of device body 820. A spring 853 is situated within device body 820 and acts upon plunger portion 855, providing a upward force upon plunger portion 855 and linearly translating arm 852. External arm portion 854 can include rubberized gripping material 856. Plate 60 is illustrated gripped between arms 851 and 852. Exemplary linear spring 853 is illustrated providing an upward force upon arm 852, such that arm 852 provides a gripping force upon plate 60.

Figure 13:
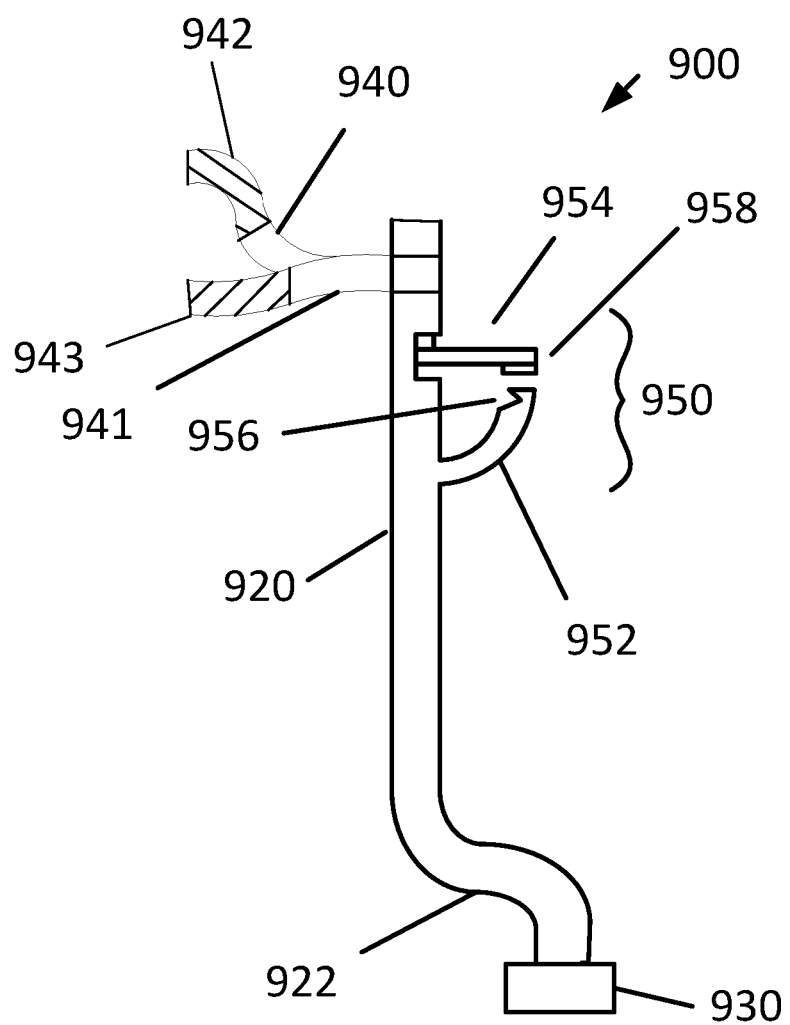
FIG. 13 illustrates an exemplary alternative embodiment of the plate clamp of the plate runner device of FIG. 1, with a plate clamp device similar to the plate clamp device of FIG. 9, in accordance with the present disclosure.

FIG. 13 illustrates an exemplary alternative embodiment of the plate clamp of the plate runner device of FIG. 1, with a plate clamp device similar to the plate clamp device of FIG. 9. FIG. 13 illustrates plate runner device 900 including a device body 920 with upper retention portion embodied as arm straps 940 and 941 at an upper end and a forearm rest embodied as a flat forearm pad 930 at a lower end. Arm straps 940 and 941 each include exemplary hook and loop fastener portions 942 and 943 configured to permit the user to secure the upper end of device body 920 to the upper arm of the user. Snaps, buttons, magnetic fasteners, or any other similar devices can be used in place of hook and loop fastener portions 942 and 943. Flat forearm pad 930 can be any padded or cushioned portion configured to soften the feel of the device upon the forearm of the user. Plate clamp 950 is illustrated including an exemplary stationary arm 952 and exemplary linear translating arm 954. Stationary arm 952 includes groove 956 similar to groove 554 of FIG. 9. Linear translating arm 954 includes gripping pad 958. Arms 952 and 954 are configured to grip onto a plate. Device body 920 includes comfort crook 922 which positions forearm pad 930 towards a midpoint of a user's arm instead of locating rest 930 close to the elbow joint of the user.

Different plate runner device configurations, plate clamp configurations, materials, and attachment methods to attach the device to the wearer are disclosed herein. The various options and embodiments are intended to be interchangeable, for example, with the elastic sleeve of FIG. 8 being used with the spring loaded plate clamp of FIG. 3. Many different variations of the disclosed devices are envisioned, and the disclosure is not intended to be limited to the particular examples provided herein.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus comprising a plate runner device, comprising:
    an elongated device body configured to be attached to an upper arm of a user;
    at least one plate clamp attached to the device body, wherein the plate clamp is configured to secure a dinner plate to the plate runner device; and
    an upper retention portion at an upper end of the device body; and
    a forearm rest at a lower end of the device body.

2. The apparatus of claim 1, wherein the forearm rest comprises a forearm crescent rest.

3. The apparatus of claim 1, wherein the forearm rest comprises a flat forearm pad.

4. The apparatus of claim 1, wherein the upper retention portion comprises an armpit retention plate.

5. The apparatus of claim 1, wherein the upper retention portion comprises an arm strap.

6. The apparatus of claim 1, wherein the plate clamp comprises:
    a stationary arm;
    a pivoting arm; and
    a spring causing the pivoting arm to clamp down upon the stationary arm.

7. The apparatus of claim 1, wherein the plate clamp comprises:
    a stationary arm;
    a linearly translating arm; and
    a spring causing the linearly translating arm to clamp down upon the stationary arm.

8. The apparatus of claim 1, wherein the plate clamp comprises a locking snap tab.

9. The apparatus of claim 1, wherein the device body comprises a crook configured to situate the forearm rest in a middle of a forearm of the user.

10. The apparatus of claim 1, wherein the plate clamp comprises a groove configured to mate with a notch on a plate.

11. An apparatus comprising a plate runner device, comprising:
    an elongated device body configured to be attached to an upper arm of a user;
    at least one plate clamp attached to the device body, wherein the plate clamp is configured to secure a dinner plate to the plate runner device; and an elastic sleeve attached to the device body configured to be worn over the upper arm of the user.

12. An apparatus comprising a plate runner device, comprising:
   an elongated device body configured to be attached to an upper arm of a user;
   at least one plate clamp attached to the device body, wherein the plate clamp is configured to secure a dinner plate to the plate runner device; and
   a plurality of plate clamps attached to the device body.

13. An apparatus comprising a plate runner device, comprising:
   an elongated device body configured to be attached to an upper arm of a user;
   at least one plate clamp attached to the device body, wherein the plate clamp is configured to secure a dinner plate to the plate runner device, wherein the plate clamp comprises rubberized gripping material.

14. An apparatus comprising a plate runner device, comprising:
   an elongated device body;
   an upper retention portion at an upper end of the device body;
   a forearm rest at a lower end of the device body; and
   at least one plate clamp attached to the device body, wherein the plate clamp is configured to secure a dinner plate to the plate runner device.

* * * * *